United States Patent [19]
Dachicourt

[11] 3,944,197
[45] Mar. 16, 1976

[54] HYDROPNEUMATIC SUSPENSION DEVICE

[75] Inventor: Augustin Dachicourt, Boulogne-Billancourt, France

[73] Assignee: Regie Nationale des Usines Renault, Boulogne-Billancourt, France

[22] Filed: Sept. 11, 1974

[21] Appl. No.: 505,018

[30] Foreign Application Priority Data
Sept. 12, 1973 France .................... 73.32809

[52] U.S. Cl. ............... 267/64 R; 188/276; 188/314; 267/DIG. 1
[51] Int. Cl.² .............................................. F16F 5/00
[58] Field of Search .......... 188/268, 269, 276, 277, 188/314; 267/64 R, 64 A, 64 B, DIG. 1

[56] References Cited
UNITED STATES PATENTS

| | | | |
|---|---|---|---|
| 3,105,574 | 10/1963 | Hoffmann et al. | 188/269 |
| 3,266,792 | 8/1966 | Sluerrill | 267/64 B |
| 3,469,661 | 9/1969 | Hoffman et al. | 188/269 |

FOREIGN PATENTS OR APPLICATIONS

| | | | |
|---|---|---|---|
| 1,069,128 | 2/1954 | France | 188/269 |
| 1,187,143 | 2/1965 | Germany | 188/269 |
| 1,150,288 | 6/1963 | Germany | 188/269 |
| 668,378 | 10/1929 | France | 267/64 A |

*Primary Examiner*—Trygve M. Blix
*Assistant Examiner*—Edward R. Kazenske
*Attorney, Agent, or Firm*—Fleit & Jacobson

[57] ABSTRACT

The invention relates to a hydropneumatic suspension device, comprising in the conventional manner a cylinder filled with a liquid in which a piston provided with spring-loaded valve is slidably mounted. This device comprises compensating apparatus for compensating the expansion of the liquid and gaseous media acting as a pneumatic spring, the compensating apparatus comprises an auxiliary space containing a gaseous fluid under pressure and a movable wall responsive on one side to the gas pressure and on the other hand to the pressure of the liquid contained in the device and also of the liquid contained in the device and also of the liquid filling the hollow rod of this device.

4 Claims, 1 Drawing Figure

U.S. Patent   March 16, 1976   3,944,197
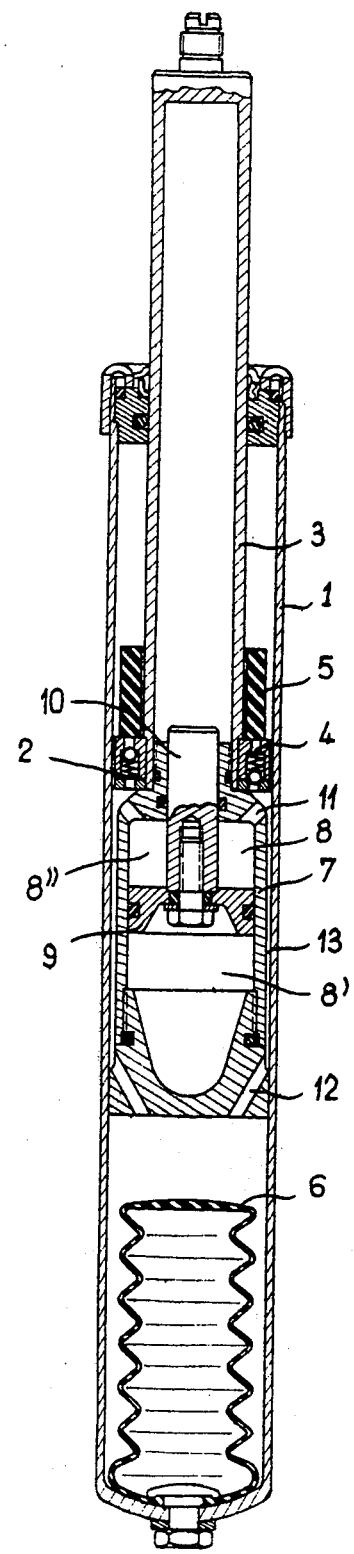

HYDROPNEUMATIC SUSPENSION DEVICE

The present invention relates in general to hydropneumatic suspension devices, notably for vehicles, and has specific reference to a device of this character which is capable of absorbing under proper conditions the volumetric variations in the gaseous and liquid fluids which are caused by temperature changes.

In fact, either during its actual operation or in case of service in a relatively warm or cold climate, the temperature of a hydropneumatic shock absorber or other suspension device of this character is likely to increase or decrease to a substantial proportion. In this case, the expansion or contraction of the liquid fluid contained in the suspension member or device, plus the expansion or contraction of the gas utilized therein and acting as a pneumatic spring, tend to alter the relative position of the piston and cylinder components of the device. If the shock-absorber or suspension device is inserted between the wheels or axles of a vehicle and the body thereof, this expansion or contraction is attended by an upward or downward movement of the vehicle body to a far from negligible extent, of the order of one inch for a temperature differential of 30°C.

It is the essential object of the present invention to avoid this inconvenience by providing compensating means in a hydropneumatic suspension device of the type broadly set forth hereinabove, whereby the temperature increase or reduction cannot imply a change in the vehicle trim.

According to this invention, an auxiliary chamber is associated with the shock absorber comprising essentially a piston provided with valve means and movable in the main cylinder filled with hydraulic fluid, said auxiliary chamber comprising a movable intermediate wall having one face exposed to the pressure of the liquid contained in said main cylinder and also to the pressure of a liquid enclosed in the hollow rod supporting the piston, the other face of said movable intermediate wall being responsive to the pressure of a gaseous fluid enclosed in said chamber, the movement of said movable wall as a consequence of temperature variations being attended by a change in the volume of a complementary space accessible to the liquid contained in said main cylinder, the volumetric variation of said complementary space corresponding to that of said liquid as a consequence of said temperature variations.

In a preferred form of embodiment of the present invention, the shock absorber piston carried by the end of a hollow rod filled with a liquid fluid under pressure has fitted therein an auxiliary cylinder provided with a piston, of which one face communicates with the volume of the main cylinder, is responsive to the liquid pressure, and has a shank extension opening into said hollow rod of said main cylinder, the other face being responsive to the pressure of a gaseous fluid enclosed in the cylinder chamber.

A clearer understanding of this invention will be had as the following description of a preferred embodiment thereof proceeds with reference to the single FIGURE of the attached drawing.

The hydropneumatic suspension device according to this invention comprises in a manner known per se a cylinder 1 connected for instance to the wheel carrier arm of the vehicle, a piston 2 slidably mounted in said cylinder 1 and a piston rod 3 connected to the vehicle body. In the device of this invention, the piston rod 3 is hollow and filled with liquid under pressure. The liquid in cylinder 1 is adapted to flow from one to the other face of the piston through valve means loaded by spring means and so arranged as to provide a two-way flow as shown at 4. The upper face of this piston carries a resilient abutment member 5 for damping out possible shocks at the end of the piston stroke against the upper end of the cylinder. At the lower end of this cylinder a flexible deformable chamber 6 containing a gaseous medium acting as a suspension spring and having a pressure corresponding to the pressure of the surrounding hydraulic fluid is provided.

The lower portion of piston 2 is rigid with a hollow auxiliary cylinder 7 forming a chamber 8 divided into two compartments 8' and 8'' by a secondary piston 9 having a shanklike upper extension 10 extending through the upper portion of cylinder 7 where it fits in the main piston 2. Openings 11 are provided in said upper portion to enable the liquid contained in cylinder 1 to penetrate into chamber 8'' through ports 12 formed in the base of the auxiliary cylinder engaging the walls of main cylinder 1 and via a gap 13 provided between the remaining portion of the skirt of cylinder 7 and said main cylinder 1.

In the inoperative position, i.e. at room temperature, the secondary piston 9 is in an intermediate position in said auxiliary cylinder 7. The volume of the lower portion 8' is filled with gaseous fluid whereby, irrespective of the position of main piston 2 in cylinder 1 and the temperature of the complete device, a minimum pressure prevails in the liquid contained in the hollow rod 3, due to the expansion of this liquid and to the compression of said gaseous medium.

When a temperature increment takes place, for example of value $\Delta t$ within the suspension device, thus causing an expansion of the hydraulic fluid contained therein and also of the gaseous fluid contained in said flexible chamber 6, the expansion of the liquid contained in rod 3 will cause the auxiliary piston 9 to travel by a distance proportional to the volumetric increment in the liquid contained in said rod 3. This movement is permitted by the compressibility of the gaseous fluid contained in said chamber 8'.

The movement of piston 9 clears a space in chamber 8'' and thus an amount of liquid corresponding to the thermal expansion having occurred penetrates into this space, due to the same temperature increment $\Delta t$ of the liquid contained in the main cylinder 1 and also of the gaseous fluid contained in said flexible chamber 6.

A reduction in the temperature prevailing in the suspension device will of course produce the reverse effects.

Both calculations and experience teach that the pressures and volumetric capacities of these various cavities can be adapted in such a manner that for a given temperature variation $\Delta t$ the movement of the secondary piston 9 will release a volume 8'' corresponding to the volumetric increment of the liquid contained in main cylinder 1 and also of the gaseous fluid contained in the flexible chamber 6, this compensation actually taking place without producing any movement of said piston 2, therefore without altering the vehicle trim.

As a typical example of the mode of operation of the hydropneumatic suspension device according to the present invention, the following data may be considered:

| | |
|---|---|
| Volume of gas in chamber 6 | 176 cu.cm (10.736 cu.in.) |
| Pressure of gas in chamber 6 | 28 kg/sq.cm (398.24 psi) |
| Total volume of liquid in cylinder 1 | 110 cu.cm (6.71 cu.in.) |
| Volume of liquid in rod 3 | 121 cu.cm (7.38 cu. in.) |
| Pressure of hydraulic liquid in the suspension device: | |
| under inoperative conditions | 28 kg/sq.cm (387.24 psi) |
| during a shock | 45 kg/sq.cm (640 psi) |
| under rebound conditions | 19 kg/sq.cm (270 psi). |

In the case of a temperature increment from −15°C to +45°C, this suspension element, if not equipped with the compensating device described hereinabove, would produce a change of about one inch in the vehicle trim. By using the above-described device, this change can be reduced to zero.

In case the temperature increment $\Delta t$ were 30°C, the volume of the liquid contained in the rod would increase by 3 cu.cm, this corresponding to a downward movement of 1.5 cm of the secondary piston 9.

For a same temperature increment $\Delta t$ of 30°C, the volume of the liquid contained in the cylinder portion below the piston 2 would increase by 21 cu.cm and this would be absorbed completely by the volumetric increment 8" previously released during the 1.5 cm downward movement of said secondary piston 9.

The characteristic volume and pressure of the gaseous fluid in chamber 8' will vary under these conditions from 129 cu.cm (7.87 cu. in) and 39 kg/sq.cm (554.7 psi), when the temperature is −15°C, to 83.5 cu.cm (5.10 cu.in) and 62 kg/sq.cm (882 psi), when the temperature is +45°C. Similarly, the pressure of the liquid contained in rod 3 of piston 2 rises to a maximum value of about 340 kg/sq.cm (4.836 psi) when the wheel is in a rebound position and the temperature is at a very high value.

A device of the type described herein and illustrated in the accompanying drawing is of course adapted to be associated with each wheel of a vehicle, but it would not constitute a departure from the basic scope of the invention to use an arrangement wherein a plurality of conventional suspension devices (i.e. without expansion compensating means) were operatively connected to a single central and common expansion compensating unit.

Although a specific form of embodiment of this invention has been described and illustrated herein, it will readily occur to those skilled in the art that various modifications and changes may be brought thereto without departing from the scope of the invention as set forth in the appended claims.

What is claimed as new is:

1. In a hydropneumatic suspension device comprising as conventional a cylinder containing liquid and gas, a piston provided with valve means loaded by spring means, said piston being disposed at the end of a hollow rod filled with liquid under pressure, and means for compensating the thermal expansion of said liquid and gas, which act as a pneumatic spring in case of temperature increments, said compensating means comprising an auxiliary chamber containing a gaseous fluid under pressure and having a movable wall responsive on one side to the pressure of said gas and on the other side to the pressure of the liquid contained in said cylinder and also to the pressure of the liquid contained in said closed volume of said rod, said chamber being rigid with said piston.

2. Hydropneumatic device as set forth in claim 1, wherein said auxiliary chamber consists of a closed hollow cylinder rigid with the suspension piston, said auxiliary cylinder containing a piston constituting said movable wall and separating a gaseous fluid enclosed on one side of said piston from the suspension liquid having access to the other side, a shank rigid with said piston of said auxiliary cylinder and adapted to penetrate into said hollow rod.

3. Hydropneumatic suspension device as set forth in claim 1, wherein a flexible space containing said gas under pressure is disposed in the chamber of said suspension device.

4. Apparatus for compensating for volumetric variations of fluids contained in a hydropneumatic suspension device, comprising:
 a liquid containing tubular body adapted to be connected to a wheel carrier arm of a motor vehicle;
 a main piston slidably received within said tubular body and having fluid passages for fluidly communicating opposite sides of said main piston;
 a sealed liquid containing hollow rod connected to said main piston and extending out of said tubular body, said hollow rod being adapted to be connected to the body of a motor vehicle;
 receptacle means fixed to said main piston and including attaching means sealingly attaching said receptacle means to said hollow rod, said receptacle means forming an auxiliary chamber and slidably received in said tubular body and including path means for defining a liquid flow path around said receptacle;
 a secondary piston slidably received within said receptacle means and dividing said receptacle means into a first compartment sealingly containing a pressurized gas and a second compartment comprising a pair of ports fluidly communicating with said path means so that the liquid contained in said tubular body can pass through said second compartment;
 a connecting rod attached to said secondary piston, said connecting rod being slidably and sealingly received in said receptacle attaching means and extendable into said hollow rod so that the liquid contained in said hollow rod acts on said connecting rod to move said secondary piston in accordance with the volumetric changes of the liquid contained in said hollow rod.

* * * * *